(12) United States Patent
Simon et al.

(10) Patent No.: US 10,843,953 B2
(45) Date of Patent: Nov. 24, 2020

(54) TURBIDIMETER SLUDGE MEASUREMENT

(71) Applicant: HACH LANGE GMBH, Berlin (DE)

(72) Inventors: Jochen Simon, Bad Durkheim (DE);
Harald Hahn, Sulzheim (DE);
Hans-Christian Bitschnau,
Kirchheimbolanden (DE)

(73) Assignee: HACH LANGE GMBH, Berlin (DE)

( * ) Notice: Subject to any disclaimer, the term of this patent is extended or adjusted under 35 U.S.C. 154(b) by 0 days.

(21) Appl. No.: 16/478,845

(22) PCT Filed: Jan. 17, 2017

(86) PCT No.: PCT/EP2017/050901
§ 371 (c)(1),
(2) Date: Jul. 17, 2019

(87) PCT Pub. No.: WO2018/133926
PCT Pub. Date: Jul. 26, 2018

(65) Prior Publication Data
US 2020/0056989 A1 Feb. 20, 2020

(51) Int. Cl.
*C02F 11/12* (2019.01)
*G01N 1/40* (2006.01)
*G01N 21/51* (2006.01)
*C02F 11/14* (2019.01)
*C02F 1/20* (2006.01)

(52) U.S. Cl.
CPC ............... *C02F 11/12* (2013.01); *C02F 1/20* (2013.01); *C02F 11/14* (2013.01); *G01N 1/4044* (2013.01); *G01N 1/4077* (2013.01); *G01N 21/51* (2013.01)

(58) Field of Classification Search
CPC ...... C02F 1/00; C02F 1/20; C02F 1/52; C02F 1/002; C02F 1/38; C02F 11/008; C02F 11/12; C02F 11/14
See application file for complete search history.

(56) References Cited

U.S. PATENT DOCUMENTS 5,606,109 A * 2/1997 Sisk .................. G01F 17/00
73/1.73

FOREIGN PATENT DOCUMENTS

| DE | 102006035996 A1 | 2/2008 |
|---|---|---|
| GB | 2295232 A | 5/1996 |
| JP | H01128150 U | 9/1989 |
| JP | H07243964 A | 9/1995 |
| JP | 2005083746 A | 3/2005 |
| JP | 2007190535 A | 8/2007 |

(Continued)

OTHER PUBLICATIONS

Linyan Zhou, "Effect of high pressure carbon dioxide on the quality of carrot juice", Jan. 11, 2009 (Year: 2009).*

(Continued)

*Primary Examiner* — Maurice C Smith
(74) *Attorney, Agent, or Firm* — Ference & Associates LLC

(57) ABSTRACT

A turbidimeter device, including: a fluidically closed turbidimeter vessel comprising a liquid sample inlet and a liquid sample outlet; a vacuum pump for generating underpressure in the turbidimeter vessel to degas the liquid sample; and an optical measurement device for an optical determination of the liquid sample turbidity. Other aspects are described and claimed.

16 Claims, 2 Drawing Sheets

(56) References Cited

FOREIGN PATENT DOCUMENTS

JP          2014079675 A      5/2014

Figure 1:
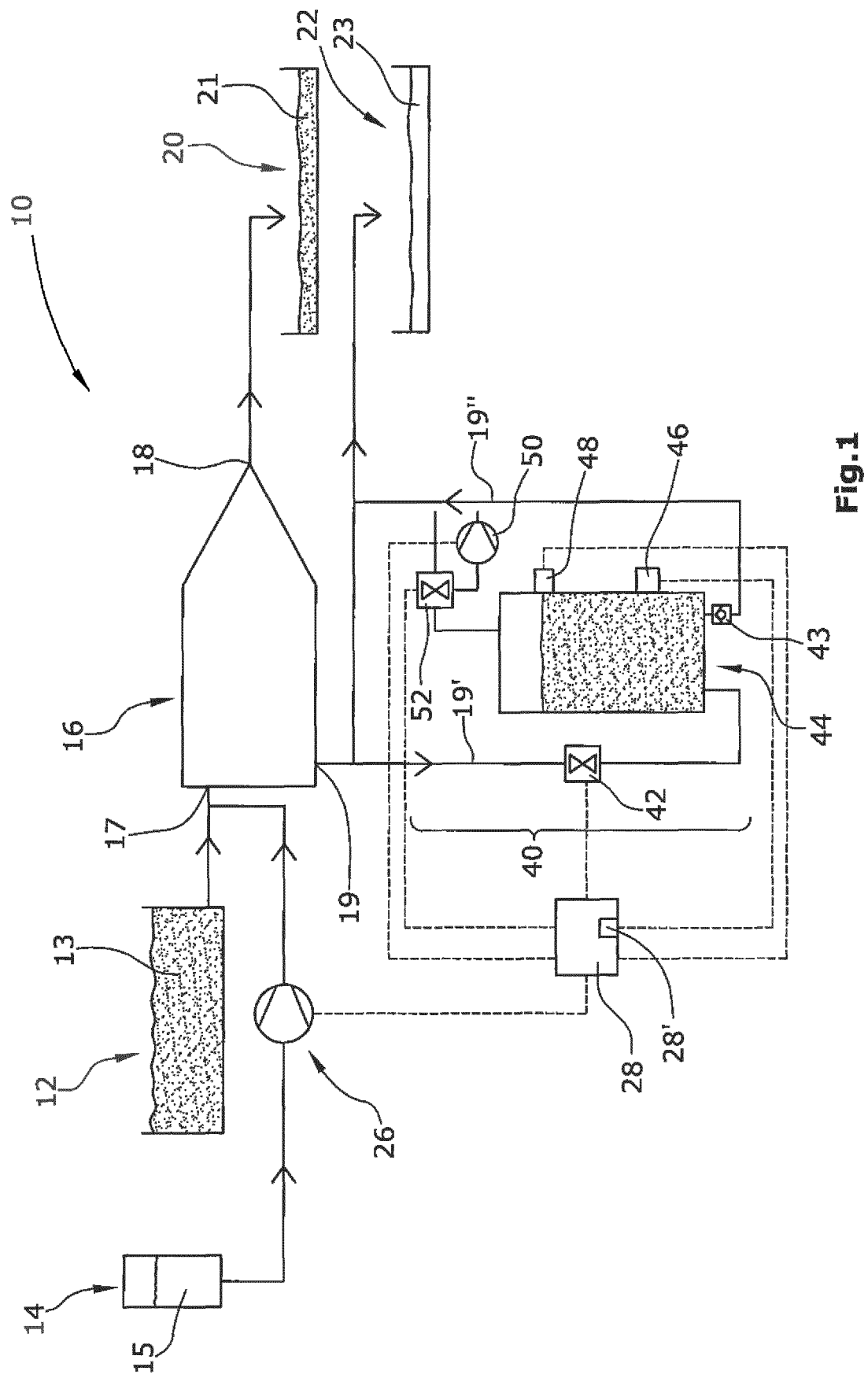

OTHER PUBLICATIONS https://www.sears.com/huanyu-instrument-wgz-1b-turbidimeter-turbidity-meter-0/p-SPM11473799225, Aug. 13, 2016 (Year: 2016).*
European Patent Office, International Search Report, dated Dec. 19, 2017, 6 pages.

* cited by examiner

TURBIDIMETER SLUDGE MEASUREMENT

The present application is a National Phase Entry of PCT International Application No. PCT/EP2017/050901, which was filed on Jan. 17, 2017, the contents of which are hereby incorporated by reference.

Turbidimeter device, sludge thickening arrangement, and method for determining the turbidity of a liquid sample with a turbidimeter device.

The invention is directed to a sludge thickening arrangement comprising a turbidimeter device, to a turbidimeter device and to a method for determining the turbidity of a liquid sample with the turbidimeter device.

A conventional sludge thickening arrangement comprises a sludge dewatering device for mechanically dewatering wet sludge of a wastewater treatment plant. Wet sludge in this context can also be aqueous sludge or wastewater. A typical sludge dewatering device is a centrifuge-type dewatering device which is fed with the wet sludge via a wet sludge inlet.

The wet sludge is centrifuged in the dewatering device and the dewatered wet sludge is flowing as dry sludge to a dry sludge target via the dry sludge outlet of the dewatering device. The sludge dewatering device is also provided with a liquid filtrate outlet through which the liquid which has been extracted from the wet sludge flows out of the dewatering device.

Before the wet sludge flows into the dewatering device, a thickening reagent is led into and is added to the wet sludge to accelerate and improve the dewatering procedure in the dewatering device. The dosage of the thickening reagent should be as high as necessary and as low as possible. In practice, the dosage is controlled in an open loop circuit by determining the constitution of the wet sludge, and dosing the reagent dependent of the determined wet sludge constitution. This open loop control process is inaccurate so that expensive thickening reagent can be wasted or the quality of the dry sludge is not perfect and, in particular, could be too wet.

It is an object of the invention to provide a sludge thickening arrangement with improved drying accuracy, to provide a turbidimeter for determining the turbidity of an aerated liquid sample and a suitable method for determining the turbidity of an aerated liquid sample.

These objects are solved with the features of independent claims 1, 9 and 12.

The sludge thickening arrangement according to the invention comprises a sludge dewatering device for mechanically and actively dewatering wet sludge. The dewatering device is preferably a centrifuge-type dewatering device and comprises a centrifuge for accelerating the dewatering of the wet sludge.

The sludge thickening arrangement is provided with a wet sludge source which is preferably a part of a complex wastewater treatment plant. The wet sludge can be of any solid particle concentration, and is not necessarily sludge with a sludge-like viscosity but can also be sludge with a relatively high water percentage. However, the wet sludge should be suitable to be dewatered in a dewatering device.

The dewatering device is provided with a wet sludge inlet through which the wet sludge coming from the wet sludge source enters the dewatering device. The wet sludge is separated by the dewatering device into dry sludge and a liquid filtrate. The dry sludge is leaving the dewatering device through a dry sludge outlet to be transferred to a dry sludge target, and the liquid filtrate is leaving the dewatering device through a liquid filtrate outlet to substantially flow to a liquid filtrate target.

The sludge thickening arrangement is provided with a thickening reagent source fluidically connected to the wet sludge inlet of the sludge dewatering device. The thickening reagent can be of any kind of flocculation reagent, for example a polymeric glue or substance which is suitable to initiate and support flocculation of the wet sludge. The thickening reagent can be fed into the wet sludge path fluidically anywhere upstream of the wet sludge inlet of the dewatering device or even directly into the dewatering device. However, it is advantageous to feed the thickening reagent into the wet sludge path upstream of the wet sludge inlet of the sludge dewatering device.

A reagent dosage means is arranged downstream of the thickening reagent source. The reagent dosage means regulates the quantity of the thickening reagent flowing into the wet sludge path. The reagent dosage means can be a pump or a valve and can be controlled by a control device.

The sludge thickening arrangement is provided with a turbidimeter device being fluidically connected to the filtrate outlet of the dewatering device. A small secondary sample current of the liquid filtrate flows from the liquid filtrate outlet of the sludge dewatering device to the turbidimeter device. The liquid filtrate sample flows into the turbidimeter through the sample inlet of the turbidimeter vessel. The turbidimeter device determines the turbidity of the liquid filtrate coming from the sludge dewatering device. The term "turbidity" in this context includes all kinds of values, as, for example, the solid content, the total suspended solids (TSS) or a substitute value.

The higher the turbidity of the liquid filtrate is, the lower is the solids retention performance of the dewatering device and the more thickening reagent should be fed into the wet sludge path, and vice versa. The turbidimeter is a suitable instrument to indirectly control the quality of the dry sludge extracted from the wet sludge in the sludge dewatering device.

The sludge thickening arrangement also comprises an electronic control device which is connected to the turbidimeter and to the reagent dosage means. The electronic control device reads the turbidity measurement values of the turbidimeter device, compares the turbidity measurement values with a turbidity set value, and operates the reagent dosage means accordingly to keep the turbidity of the liquid filtrate stable.

The turbidimeter device should have a relatively short measurement interval to thereby realize a relatively short reaction time of the control circuit.

A suitable turbidimeter device according to the invention comprises a fluidically closed turbidimeter vessel comprising a liquid sample inlet and a liquid sample outlet. Preferably, the liquid sample inlet and the liquid sample outlet are provided separately but could, alternatively, be realized as one single and switchable access opening at the turbidimeter vessel.

The turbidimeter device is provided with an optical measurement device for an optical determination of the liquid sample turbidity. The optical measurement device is typically provided with a light emitter directing a measurement light beam into the turbidimeter vessel and with a light sensor detecting the emitter light scattered by solid particles of the liquid sample.

The turbidimeter device is provided with a vacuum pump for generating an underpressure in the turbidimeter vessel to degas the liquid sample in the turbidimeter vessel. During the degassing interval, the turbidimeter vessel is fluidically substantially closed so that an underpressure of 100 to 800 mbar can quickly be realized within the turbidimeter vessel. An aerated liquid sample is quickly degassed under negative pressure so that a true turbidity measurement value can be generated after a relatively short degassing interval.

Additionally, the vacuum pump can also be used for filling the turbidimeter vessel with the liquid sample so that no separate filling pump is necessary.

A method for determining the turbidity of a liquid sample with the turbidimeter device of one of the claims directed to the turbidimeter device comprises the following method steps:

First, the turbidimeter vessel is filled with a liquid sample through the liquid sample inlet. The liquid sample can be the liquid filtrate of a sludge dewatering device. After the turbidimeter vessel is sufficiently filled with the liquid sample, the turbidimeter is fluidically closed and a vacuum is generated in the turbidimeter vessel by activating the vacuum pump. The term 'vacuum' in this context means an underpressure of, for example, 100 to 900 mbar which corresponds with a total pressure of 1000 to 100 mbar.

The optical measurement device is activated and the liquid sample turbidity is continuously or quasi-continuously measured. The activation of the measurement device can start before or after the vacuum pump has been activated. The liquid sample turbidity measurement values are continuously examined by the control device. In the beginning of the measurement interval, the turbidity measurement values will not be stable but will continuously decrease because the aeration bubble concentration caused by the underpressure will decrease. As soon as the liquid sample is more or less completely de-aerated, the liquid sample turbidity values will become stable within a particular range. The control device will output a final turbidity measurement value after the measured liquid sample turbidity values are stable and are within a fixed value range R of, for example, a volatility range of 30%, for a fixed minimum time period T of, for example, one or a few minutes. The volatility range R and the fixed minimum time period T can be chosen by the user.

After the final turbidity measurement value has been determined, the liquid sample is discharged from the turbidimeter vessel and the turbidimeter vessel is flushed with clear water to prepare the turbidimeter for the following measurement cycle.

One complete measurement cycle only takes a few minutes so that a relatively short reaction time of the control circuit can be realized.

Preferably, a sample outlet valve is provided downstream of the liquid sample outlet to fluidically close the liquid sample outlet during the degassing interval. The degassing interval is the period during which the liquid sample in the turbidimeter vessel is under negative pressure. The sample outlet valve avoids that the liquid can flow through the liquid sample outlet of the turbidimeter vessel back into the turbidimeter vessel when negative pressure is present in the turbidimeter vessel. The sample outlet valve makes sure that the liquid sample is sucked into the turbidimeter vessel via the liquid sample inlet, only.

According to a preferred embodiment of the invention, a first flushing opening is provided at the turbidimeter vessel. A flushing liquid coming from a flushing liquid source is injected into the turbidimeter vessel through the first flushing opening. After the final turbidity measurement value has been generated, the liquid sample flows out of the turbidimeter so that the turbidimeter vessel is emptied. Then the turbidimeter vessel is rinsed, flushed and thereby cleaned with the flushing liquid which can be, for example, clean water. Preferably, the first flushing opening is arranged axially in-line with the optical measurement device so that the window of the optical measurement device is directly hit by the flushing liquid jet and is intensively mechanically cleaned.

According to another embodiment of the invention, a second flushing opening is provided at the top of the turbidimeter vessel. The second flushing opening causes the flushing liquid to flow along the side wall of the turbidimeter vessel from the top to the bottom so that no sample liquid remains in the turbidimeter vessel.

According to a preferred embodiment of the invention, the turbidimeter device is provided with a progression evaluation unit for detecting the stability or constancy of the turbidimeter measurement values generated by the optical measurement device. The progression evaluation unit is necessary to detect if the measured liquid sample turbidity is stable or constant within a fixed range R for a fixed minimum time period T, as already explained above.

Preferably, a filling level detector is provided at the turbidimeter device to detect the liquid filling level of the liquid sample in the turbidimeter vessel. As soon as the filling level detector detects that the inflowing liquid sample has arrived the set filling level, the liquid filling action is stopped, and the de-aeration and the measurement action are started. Preferably, the filling level detector can be adapted to define different set filling levels. The filling level detector can be, for example a, a capacitive filling level detector.

According to a preferred embodiment, the liquid sample inlet of the turbidimeter device can be provided at the bottom of the turbidimeter vessel. During the sample liquid filling action, the sample liquid inside the turbidimeter vessel is continuously mixed and in motion so that the solid particles cannot settle but remain homogenously distributed in the liquid sample volume. This guarantees that a real turbidity value is determined.

Figure 2:
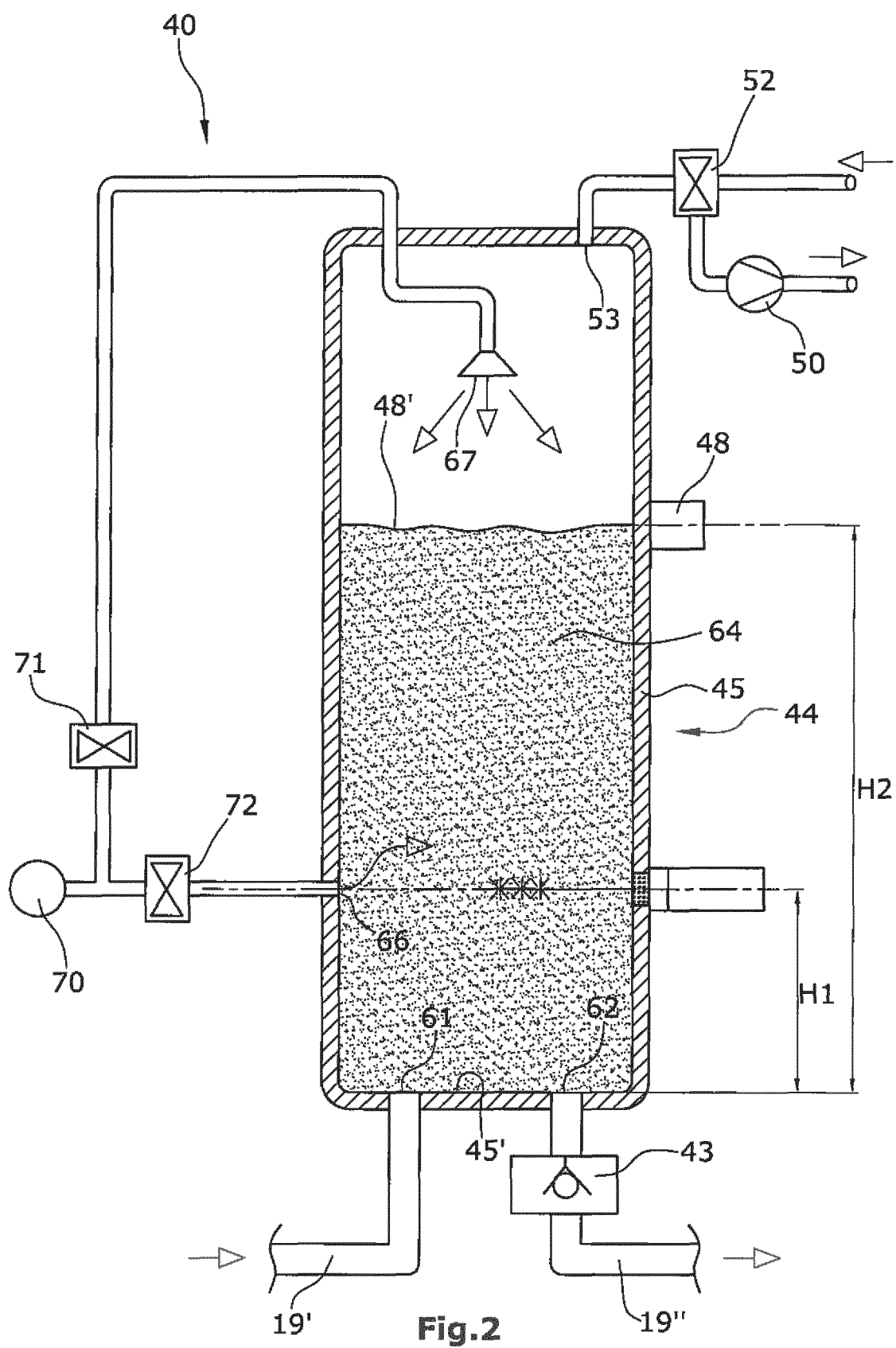

One embodiment of the invention is explained with reference to the figures, wherein FIG. 1 schematically shows a sludge thickening arrangement with a turbidimeter device, and FIG. 2 shows schematically the turbidimeter device of the sludge thickening arrangement of FIG. 1 in more detail.

FIG. 1 schematically shows a sludge thickening arrangement 10 which can be a part of a wastewater treatment plant (not shown). The sludge thickening arrangement 10 is basically provided with a wet sludge source 12 comprising wet sludge 13 coming from an upstream wastewater treatment section, with a thickening reagent source 14 with a thickening reagent 15, with a sludge dewatering device 16 and with a turbidimeter device 40. The sludge dewatering device 16 is a centrifuge-type dewatering device and is provided with a wet sludge inlet 17 and two outlets 18, 19, namely a dry sludge outlet 18 and a liquid filtrate outlet 19. The thickening reagent 15 of the thickening reagent source 14 is pumped by a reagent dosage means 26 and is thereby fed into the wet sludge current flowing from the wet sludge source 12 to the wet sludge inlet 17.

The wet sludge is centrifuged in the sludge dewatering device 16 and is thereby separated into a dry sludge leaving the dewatering device 16 via the dry sludge outlet 18 and a liquid filtrate leaving the sludge dewatering device 16 via the liquid filtrate outlet 19. The better the separation of sludge and liquid is performed in the dewatering device 16, the cleaner and less turbid is the liquid filtrate leaving the dewatering device 16. The dry sludge is pumped to a dry sludge target 20, which is, for example, a tank for the dry sludge 21.

The main current of the liquid filtrate leaving the dewatering device 16 through the liquid filtrate outlet 19 is flowing to a liquid filtrate target 22 which can be, for example, a liquid filtrate tank for collecting the liquid filtrate 23.

A secondary liquid filtrate current is flowing from the liquid filtrate outlet 19 to the turbidimeter device 40 via a sample inlet line 19' and an electric inlet line valve 42. The sample inlet line 19' leads into a turbidimeter vessel 44 of the turbidimeter device 40, and, more precisely, to a liquid sample inlet 61 at the bottom 45' of the vessel wall 45 of the fluidically closed turbidimeter vessel 44. A liquid sample outlet 62 is also provided at the bottom 45' of the turbidimeter vessel 44 so that the liquid sample 64 can flow through the liquid sample outlet 62 via a sample outlet valve 43 which is a check valve and via the sample outlet line 19" to the liquid filtrate target 22.

The turbidimeter device 40 is provided with an optical measurement device 46 and a corresponding light-transmissive window 46' in the vessel side wall 45. The optical measurement device 46 is typically an optical turbidimeter measurement instrument which detects measurement light emitted by the measurement device 46, scattered by the solid particles of the liquid sample 64 and received by the light receiver of the measurement device 46.

The turbidimeter device 40 is provided with a flushing arrangement comprising a flushing liquid source 70 which provides, for example clear water as the flushing liquid. The flushing arrangement is provided with a first flushing valve 72 and a first flushing opening 66 in the side wall of the vessel wall 45. The first flushing opening 66 is exactly axially in-line with the optical measurement device 46, and in particular is in-line with the optical window 46' of the optical measurement device 46 so that the flushing liquid jet directly hits the optical window 46'. The flushing arrangement is provided with a second flushing path comprising a second flushing valve 71 and leading to a second flushing opening 67 at the top of the interior of the turbidimeter vessel 44.

The turbidimeter device 40 is provided with a filling level detector 48 at the side wall 45 of the turbidimeter vessel 44. The filling level detector 48 is a capacitive detector which can be vertically shifted to thereby adjust the set filling level 48' of the liquid sample 64. A stirrer can be provided inside the turbidimeter vessel 44 to guarantee homogeneity of the liquid sample 64.

The inner diameter of the cylindrical turbidimeter vessel 44 can be 5 to 10 cm, the total height of the turbidimeter vessel 44 can be 40 to 200 cm. The vertical distance H1 from the turbidimeter vessel bottom 45' is about 10 cm, the vertical distance H2 of the filling level detector 48 is about 100 cm but can generally be chosen by the user.

The turbidimeter device 40 is provided with an electronic control device 28 comprising a progression evaluation unit 28'.

The turbidimeter device 40 is provided with a pneumatic arrangement comprising a pneumatic access opening 53 at the top of the turbidimeter vessel 44, a vacuum pump 50 fluidically connected with the pneumatic access opening 53 and a pneumatic 3/2-valve 52 fluidically connecting the pneumatic access opening 53 either to the vacuum pump 50 or to atmospheric pressure, or to close all lines.

The sludge thickening arrangement 10 works as follows:

The sludge dewatering device 16 is continuously fed with a mix of wet sludge 13 coming from the wet sludge source 12 and of thickening reagent 15 coming from the thickening reagent source 14 via the reagent dosage means 26. The thickening reagent causes flocculation of the wet sludge. The correct dosage of the reagent is very important to avoid gluing of the sludge or to avoid insufficient flocculation.

This liquid mix enters the sludge dewatering device 16 via its sludge inlet 17, is centrifuged and is thereby dewatered. The resulting dry sludge is flowing through the dry sludge outlet 18 to the dry sludge target 20. The liquid filtrate is flowing through the liquid filtrate outlet 19, and a primary current thereof is flowing to the liquid filtrate target 22.

At the beginning of a measurement cycle, the vacuum pump 50 is activated and the pneumatic valve 52 is switched into the vacuum mode so that the pneumatic access opening 53 is fluidically connected to the vacuum pump 50. A secondary current of the liquid filtrate is flowing via the sample inlet line 19' and the sample inlet valve 42 into the turbidimeter vessel 44 for filling the turbidimeter vessel 44 with the liquid sample 64. The liquid sample 64 is thereby sucked into the turbidimeter vessel 44 until the filling level detector 48 detects the arrival of the filling level 48'.

As soon as the liquid filling level 48' arrives at the filling level detector 48, the control device 28 closes the sample inlet valve 42 so that a vacuum is generated inside the turbidimeter vessel 44. This causes the liquid sample 64 to de-aerate so that ascending air bubbles are generated in the liquid sample 64. The optical measurement device 46 is activated and detects a relatively high turbidity as long as the de-aeration is intensive. After a few minutes, the de-aeration is finished so that the bubble-density in the liquid sample 64 dramatically decreases and the turbidity value measured by the optical measurement device 46 dramatically decreases, as well. The liquid sample 64 finally is more or less free of air bubbles. The measurement values generated by the optical measurement device 46 are processed in the progression evaluation unit 28'. As soon as the liquid sample turbidity values are stable within a fixed range R of 30% for a fixed minimum time period T of 2,0 minutes, the progression evaluation unit 28' determines and generates a final turbidity measurement value.

As soon as the final turbidity measurement value has been generated, the pneumatic valve 52 is switched to open the pneumatic access opening 53 to atmospheric pressure so that the liquid sample 64 is completely flowing out of the turbidimeter vessel 44 because of gravity. As soon as the turbidimeter vessel 44 is emptied, the flushing valve's 71, 72 are opened so that the interior of the turbidimeter vessel 44 is flushed and cleaned. As soon as the vessel flushing procedure is finished, the turbidimeter vessel 44 is prepared and ready for the following measurement cycle.

This final turbidity measurement value is compared by the control device 28 with a set value, and the control device 28 regulates the reagent dosage means 26 accordingly to keep the turbidity of the liquid filtrate within the set value range. The control device 28 can be an arrangement of numerous single control units distributed over the sludge thickening arrangement 10.

The invention claimed is:

1. A turbidimeter device, comprising:
   a fluidically closed turbidimeter vessel comprising a liquid sample inlet and a liquid sample outlet, wherein a first flushing opening is provided through which a flushing liquid coming from a flushing liquid source is injected into the turbidimeter vessel;

a vacuum pump for generating underpressure in the turbidimeter vessel to degas the liquid sample; and an optical measurement device for an optical determination of the liquid sample turbidity.

2. The turbidimeter device of claim 1, wherein a sample outlet valve is provided downstream of the liquid sample outlet to fluidically close the liquid sample outlet during the degassing Interval.

3. The turbidimeter device of claim 1, wherein a first flushing opening is arranged axially in-line with the optical measurement device.

4. The turbidimeter device of claim 1, wherein a second flushing opening is provided at the top of the turbidimeter vessel.

5. The turbidimeter device of claim 1, wherein an electronic control device is provided for detecting the constancy of the turbidity measurement value of the optical measurement device.

6. The turbidimeter device of claim 1, wherein a filling level detector is provided to detect the liquid filling level of the liquid sample in the turbidimeter vessel.

7. The turbidimeter device of claim 1, wherein the liquid sample inlet is provided at the bottom of the turbidimeter vessel.

8. A sludge thickening device, comprising:
a sludge dewatering device for a dewatering sludge, the dewatering device being provided with a wet sludge inlet, a dry sludge outlet and a liquid filtrate outlet;
a wet sludge source fluidically connected to the wet sludge inlet of the sludge dewatering device;
a thickening reagent source fluidically connected to the wet sludge path between the wet sludge source and the sludge dewatering device;
a turbidimeter device being fluidically connected to the filtrate outlet of the dewatering device, a reagent dosage means arranged downstream of the thickening reagent source; and
a closed loop control circuit comprising a control device being connected to the turbidimeter device and to the reagent dosage means, the control device controlling the turbidity of the liquid filtrate by dosing the thickening reagent lead into the wet sludge via the reagent dosage means.

9. The sludge thickening device of claim 8, wherein the dewatering device is a centrifuge-type dewatering device.

10. The sludge thickening device of claim 8, wherein a sample outlet valve is provided downstream of the liquid sample outlet to fluidically close the liquid sample outlet during the degassing Interval.

11. The sludge thickening device of claim 8, wherein a first flushing opening is provided through which a flushing liquid coming from a flushing liquid source is injected into the turbidimeter vessel.

12. The sludge thickening device of claim 8, wherein a first flushing opening is arranged axially in-line with the optical measurement device.

13. The sludge thickening device of claim 8, wherein a second flushing opening is provided at the top of the turbidimeter vessel.

14. The sludge thickening device of claim 8, wherein an electronic control device is provided for detecting the constancy of the turbidity measurement value of the optical measurement device.

15. The sludge thickening device of claim 8, wherein a filling level detector is provided to detect the liquid filling level of the liquid sample in the turbidimeter vessel.

16. A method of determining the turbidity of a liquid sample with a turbidimeter device comprising:
filling the turbidimeter vessel with the liquid sample through a liquid sample inlet, wherein a first flushing opening is provided through which a flushing liquid coming from a flushing liquid source is injected into the turbidimeter vessel;
generating a vacuum in the turbidimeter vessel by activating a vacuum pump;
activating a measurement device and continuously measuring the liquid sample turbidity; and
outputting a final measurement value after the measured liquid sample turbidity is stable within a fixed range R for a fixed minimum time period T.

* * * * *